United States Patent [19]

Ciminelli

[11] Patent Number: 5,157,973
[45] Date of Patent: Oct. 27, 1992

[54] PRESSURE SENSOR WITH INTEGRAL OVERPRESSURE PROTECTION

[75] Inventor: Mario J. Ciminelli, Spencerport, N.Y.

[73] Assignee: Process Automation Business, Inc., Columbus, Ohio

[21] Appl. No.: 324,122

[22] Filed: Mar. 16, 1989

[51] Int. Cl.⁵ .......................... G01L 7/08; G01L 9/12
[52] U.S. Cl. ........................................ 73/718; 73/724; 361/283
[58] Field of Search .................... 73/715–728; 338/4, 42; 361/283; 336/30; 92/103 SD

[56] References Cited

U.S. PATENT DOCUMENTS

| 3,289,136 | 11/1966 | Marks et al. | 73/725 |
| 4,612,812 | 9/1986 | Broden | 73/718 |

FOREIGN PATENT DOCUMENTS

| 0127637 | 6/1987 | Japan | 73/718 |
| 0569886 | 8/1977 | U.S.S.R. | 73/719 |

Primary Examiner—Donald O. Woodiel
Attorney, Agent, or Firm—John H. Hulholland

[57] ABSTRACT

A pressure sensor 10 is made up of silicon diaphragm 12 sandwiched between two housing members 20 and 22 with external conduits 24, 26. The diaphragm 12 has a central rigid disc 14 which moves axially like a piston, a peripheral rim 16 and an integral web 18. The rim 16 is undercut to provide recesses 46 and 48 (FIG. 1 ) or recess 50 (FIG. 6) which reduces the net reactive forces tending to separate the joints 42 and 44 between rim 16 and the housing parts 20, 22. Overpressure stop surfaces 28 and 30 on the inside of the housing cavity form capacitor gaps with the opposite flat sides of rigid disc 14 for signal output to readout circuitry 40 in the rated range. Configurations for gage pressure and absolute pressure are disclosed, as well as a system of isolation from corrosive process environments.

19 Claims, 2 Drawing Sheets

PRESSURE SENSOR WITH INTEGRAL OVERPRESSURE PROTECTION

BACKGROUND OF THE INVENTION

The invention relates to gage, absolute and differential pressure measurement by means of a pressure sensor with integral overpressure protection for the transducer diaphragm and joints.

Many useful pressure transducer designs are known. See, for example, U.S. Pat. Nos. 4,295,376; 4,458,537 and overpressures without failure.

A few pressure transducer devices, such as that disclosed in U.S. Pat. No. 3,793,885 to Frick, have successfully included a diaphragm member and cooperating housing which provide integral overpressure protection. The diaphragm of that invention has a peripheral rim and web surrounded flexible circular disc body of a free edge design which, typically, has a flexible disc member (D) to web radial length (L) ratio (D/L) greater than 10, a web radial length to web thickness (t) ratio L/t less than 5 and a rim thickness (T) to web thickness ratio T/t less than 4. The Frick diaphragm is welded between two housing pieces to form a pressure capsule. The shape of the inner surfaces of the housing pieces conform to the curved shape of the deflected Frick diaphragm disc so that they fully support the diaphragm during overpressure conditions. During operation under pressure, the welded joints between the diaphragm rim and housing pieces of the capsule are clamped together. This ensures that they are compressively loaded during operation.

The large size of the Frick device adds weight and cost. Also, its concave curved shape requires some complex machining and assembly procedures since the curved convex shape of the deflected diaphragm can be difficult to accommodate precisely using conventional machining techniques. The size of the Frick device also requires that it be filled with a large volume of silicone oil. This can degrade the temperature performance of this type of device.

Most sensors use other methods to protect the sensor during overpressure. They commonly utilize another mechanical system put in parallel with the sensor to protect it by accepting the majority of the overpressure. Many also need to be externally clamped to compressively preload their joints so that they don't fail. These methods add cost and complexity, degrade performance, and reduce reliability. This invention does not need any such device.

SUMMARY OF THE INVENTION

The invention is a novel pressure sensor with integral overpressure protection which can be used for the measurement of differential, gage and absolute pressures with minor changes to its configuration. The unique geometry of the pressure sensor enables it to withstand overpressures of two to three orders of magnitude above its rated pressure without the need for external clamping.

The preferred embodiment of the sensor of the invention is made up of three pieces. First, a unique micromachined silicon rigid center diaphragm disc with flat sides and its largest overall dimension D; a rigid undercut and recessed rim of thickness T; and, a flexible thin web of a thickness t integral with the rigid center diaphragm disc and said peripheral rim and spanning the entire annulus a distance L between. The rim recess opens in the direction toward the diaphragm disc and the web is integrally attached to the rim within the recess. The undercut portion of the rim which defines the recess is on at least one side of the web.

The second and third pieces are two silicon or glass housing pieces in which the diaphragm disc is suspended by the web in a central cavity formed by the rim and two housing members, each with a conduit to the exterior. Between the housing parts, the rim is sandwiched to define two sealed rim joints.

Each housing part includes a flat surface in its cavity defining wall opposite the suspended disc for engagement of a flat side of a diaphragm disc flat wall portion upon encountering an overpressure condition. The flat side of the disc and the cavity defining flat surface may be conductively coated to define a capacitor which produces a gap-proportional, and therefore pressure-proportional, electrical signal through electrical leads attached thereto. Alternatively, piezoresistors can be ion implanted or diffused into the thin web for creating a proportional electrical output.

The rigid center diaphragm is distinguished by a D/l ratio less than 10. The L/t and T/t ratios are greater than 5. (See FIG. 2.) The novel diaphragm also has a piston-like deflection characteristics because the disc is rigid and the web, only, gives during overpressure conditions. This means the easily machined flat housing cavity inner surface supports only the flat disc surface during overpressure and the web is free to deflect.

The sensor diaphragm of the invention is unique in its stress reducing rim joints. These joints generate compressive forces when the diaphragm is under pressure. This eliminates the need for any external clamping.

Silicon was chosen as the diaphragm material because of the advantages only it offers to this design. It is an excellent mechanical material because it is extremely strong, and virtually non-hysteretic. It can be micromachined into complex three dimensional shapes with tight tolerances and uniformity. Also, silicon sensors can be batch fabricated, which provides cost advantages and simplifies assembly.

DETAILED DESCRIPTION OF THE ILLUSTRATED EMBODIMENTS

Figure 1:
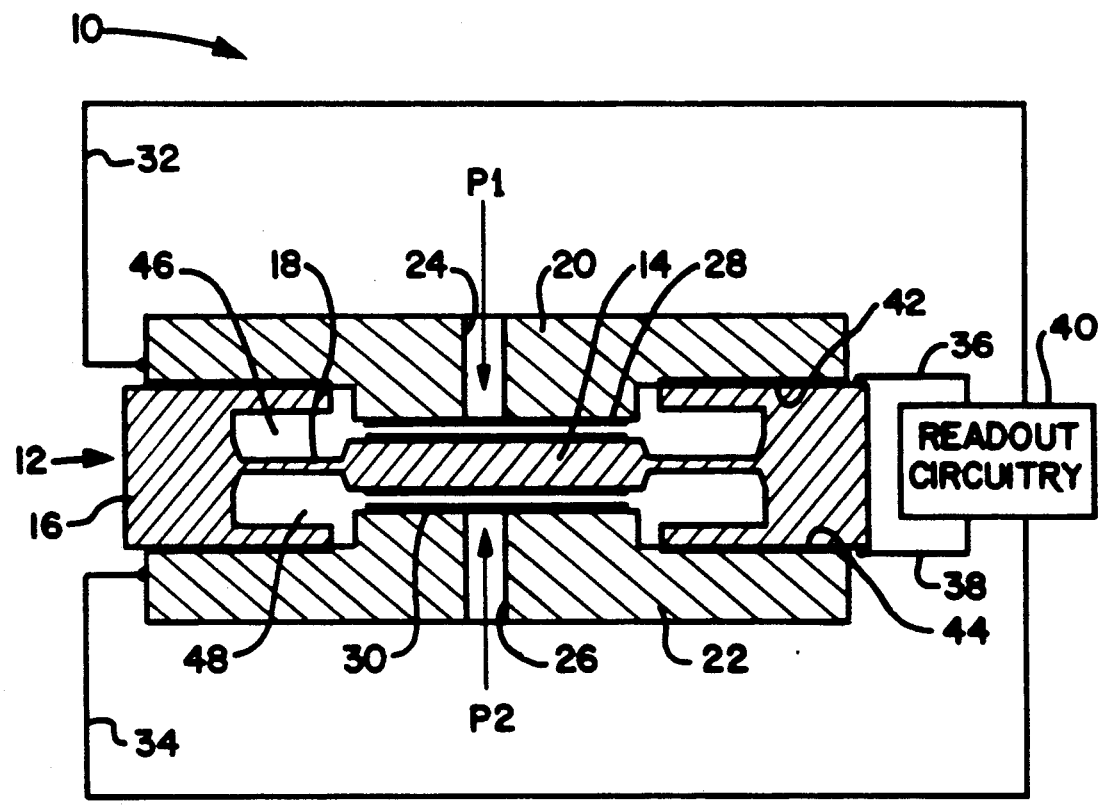
FIG. 1 is a schematic cross-sectional elevational view of the preferred sensor embodiment of the invention.

The numeral 10 generally designates a pressure transducer type of sensor constructed according to the principles of the invention. The sensor 10 has a silicon diaphragm, generally designated by the numeral 12, which is made up of a rigid flat walled center disc portion 14, a rigid peripheral rim 16 and a flexible thin web 18 integral with rigid center disc 14 and rim 16.

The diaphragm 12, at its peripheral rim 16, is sandwiched between two housing members 20, 22 which define with it a central cavity in which the diaphragm disc 14 is suspended by web 18. The housing parts or members 20, 22 have conduits 24 and 26, respectively to the exterior for communication of pressure $P_1$ and pressure $P_2$. Flat surface portions 28 and 30, respectively, of housing portions 20 and 22 are each thus spaced across a gap from a flat side wall of disc 14 such that under overpressure conditions, the surfaces 28 and 30 act as protective stops the disc 14, which because of its rigidity moves axially in piston-like motion as web 18 flexes.

The flat surfaces 28 and 30 are conductively coated, as are the flat side faces of disc 14 which face them, such that conductive leads therefrom, 32, 34, 36 and 38, carry an electrical signal indicating a capacitance change proportional to a pressure change, in the rated range of the transducer, to the readout circuitry 40.

If, for example, the pressure $P_2$ exceeds the rates pressure, the disc 14 comes into contact with the overpressure support housing surface 28. This reduces the effective area of the diaphragm 12 to only that of thin web 18. The correct ratio of thickness t to effective area (a function of L) must be used for the web 18. When this is done, overpressures of two to three orders of magnitude above the transducer's rated pressure can be accommodated without failure.

Figure 2:
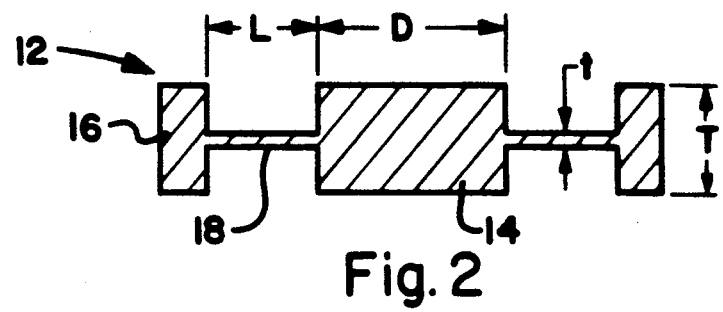
FIG. 2 is a dimensional schematic cross-sectional view of the diaphragm of the sensor of FIG. 1.

Referring to the dimensions of FIG. 2, it is important that the diaphragm, as schematically illustrated and dimensioned there, have a D/L ratio less than ten and L/t and T/t ratios each greater than five.

Figure 3:
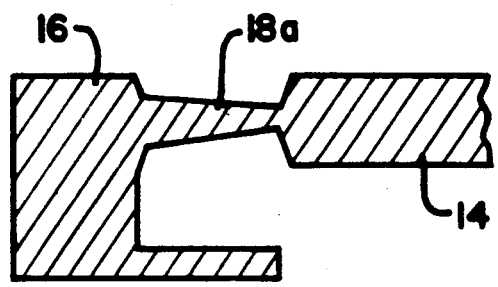
FIG. 3 is a fragmentary schematic cross-section of an alternative diaphragm of the sensor of FIG. 1.

Thin web 18a can be tapered as shown in FIG. 3. This minimizes the diaphragm stress for a given deflection. It is difficult to micromachine a web with this shape so it has to be approximated.

The diaphragm 12 is unique, also, because of its stress reducing peripheral rim joints 42 and 44 with housing parts 20 and 22. These joints generate compressive forces when the diaphragm 12 is under pressure. This eliminates the need for any external clamping. Conventional micromachining techniques such as chemical or plasma etching are used on the silicon material to provide the improved peripheral rim and resulting joints 42 and 44. The undercut geometry of the rim 16 produces recesses 46 and 48 on either side of web 18 in the FIG. 1 embodiment or the recess 50 on only one side of web 18 in the embodiment of FIG. 6.

Figure 4:
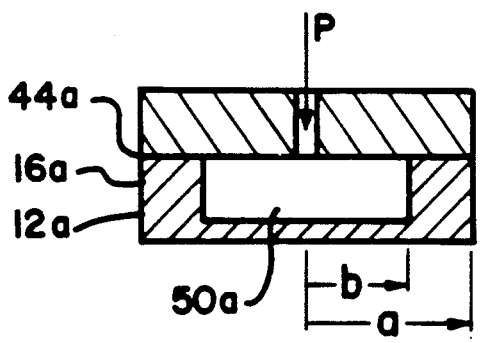
FIG. 4 is a schematic cross-sectional view to illustrate forces acting on a rim-to-housing joint of a conventional prior art pressure transducer.
Figure 5:
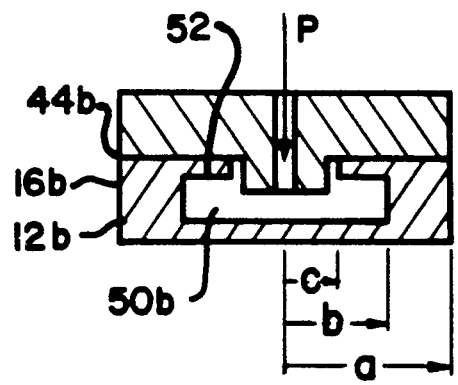
FIG. 5 is a schematic cross-sectional view to illustrate forces acting on a rim-to-housing joint of the pressure transducer of the invention.

The rim joints 42 and 44 are based on principles which can be seen from comparing schematic prior art FIG. 4 with schematic FIG. 5. In both cases, pressure P acts on a diaphragm, 12a in FIG. 4 and 12b in FIG. 5, through cavity 50a, 50b, respectively. The pressure also acts compressively on surface 52 of undercut rim 16b. This decreases the net reaction forces (Fr5) in joint 44b made by undercut rim 16b. This is because the pressure area (Ap5) of FIG. 5 is smaller than the pressure area (Ap4) of FIG. 4. The 16a rim, without an undercut does not have this net reduction. It is that the pressure area (Ap5) is smaller and that the area of joint (Aj5) is larger, that the joint stress is decreased by the FIG. 5 design. The connection of web 18 is made within the recess 46, 48 or 50 formed by the undercut of rim 16 to permit the larger joint area and attendant stress reduction.

The calculation of the smaller net reaction forces of the FIG. 5 arrangement than of the prior art FIG. 4 arrangement is as follows:

| FIG. 4 | FIG. 5 |
| --- | --- |
| $Ap_4 = \pi(b^2)$ | $Ap_5 = \pi(C^2)$ |
| $Fr_4 = P\, A_{p4}$ | $Fr_5 = P\, A_{p5}$ |

The calculation of the larger joint area of FIG. 5 is as follows:

$$Aj4 = \pi(a^2 - b^2) \qquad Aj5 = \pi(a^2 - C^2)$$

The reduction of joint stress (Sj5) in the larger joint area of FIG. 5 is as follows:

$$Sj4 = Fr4/Aj4 \qquad Sj5 = Fr5/Aj5$$

In summary:

| |
| --- |
| Ap5 < Ap4 |
| Fr5 < Fr4 |
| Aj5 > Aj4 |
| Sj5 < Sj4 |

The preferred embodiment of FIG. 1 is a capacitive differential pressure transducer. Pressures $P_1$ and $P_2$ act on the rigid disc 14 and housing cavity portions on either side of web 18 which are defined by the internal surfaces of housing parts 20 and 22 and peripheral rim 16 of diaphragm 12. The rim is bonded in sandwich-like manner between parts 20 and 22 to create the sealed joints 42 and 44 by means of silicon fusion, or, anodic or glass bonding techniques. The capacitor plates on the flat faces of disc 14 and at 28 and 30 on the housing parts 20 and 22 are put on by depositing or by doping the conductive materials on or into the surfaces, thus forming two capacitors, one on each side of disc 14.

The disc 14 moves toward one of the housing parts 20, 22 in direct response to the pressure difference between $P_1$ and $P_2$. This will cause one capacitor to increase and one to decrease. These changing capacities can be converted by conventional output circuitry 40 into an electrical signal directly proportional to the pressure difference between $P_1$ and $P_2$. The gap formed between the disc 14 flat surfaces and the surfaces 28 and 30 will be roughly five to ten (5 to 10) times the deflection from rated pressure of diaphragm 12. This ensures that the diaphragm disc 14 will not come into contact with its stops 28 and 30 until after the rated pressure of the sensor 10 is exceeded.

Once a stop is engaged, the sensor 10 is in its overpressure mode. At this point thin web 18 and rim joints 42 and 44 protect the sensor 10 from damage. The electrical output signal of the device indicates that the rated pressure has been exceeded. When the pressure is brought back within range, the sensor will assume normal operation and no damage will have occurred.

The device could be converted into gage pressure by venting the cavity on one side of diaphragm 12 to atmosphere. In order to measure absolute pressure, the cavity on one side of diaphragm 12 would be evacuated and sealed. Both of these conversions would be simple to perform.

An alternative embodiment, sensor 10 of FIG. 1 could be pierzoresistive rather than capacitive. Pierzoresistors can be ion implanted or diffused into thin web 18. The stress at the top and bottom surfaces on each end of the web are alternately in compression or tension. The stress levels vary in direct proportion to the applied pressure P1 or P2. Four resistors can be arranged into a wheatstone bridge which is yield an electrical output directly proportional to the pressure change.

Figure 6:
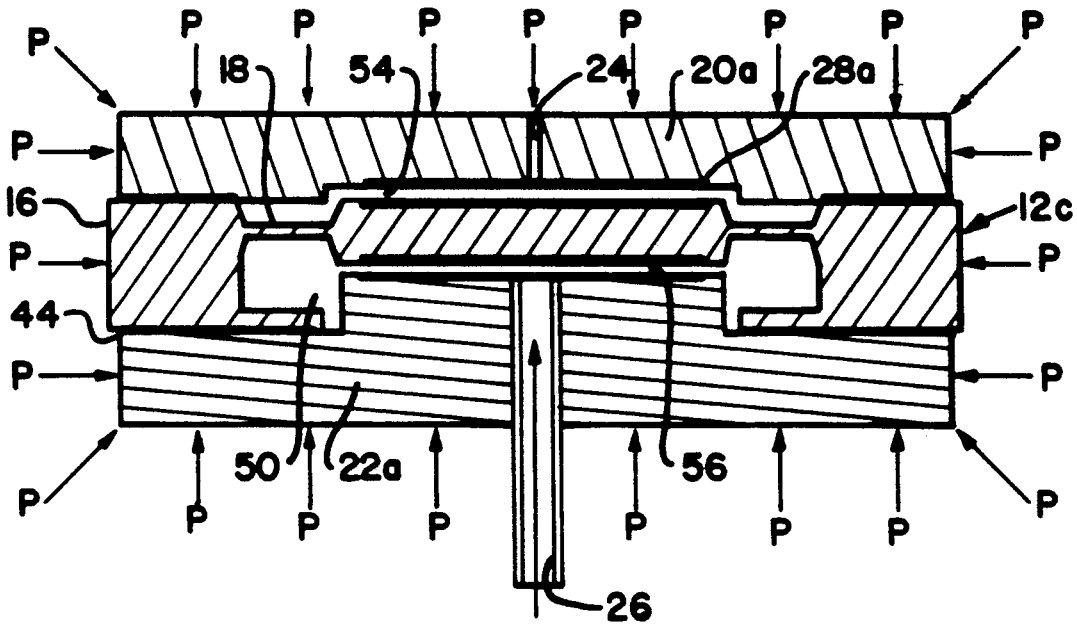
FIG. 6 is a view similar to FIG. 1 of a configuration alternative for differential pressure measurement.

Another configuration for differential pressure measurement is shown in FIG. 6. Its main benefit is that it uses less aggressive micromachining techniques. Diaphragm 12 still has thin web 18 but only one undercut recess rim 50. Cover plate 20a with surface recess 28a is bonded to the diaphragm 12c. This forms cavity 54 and gives overpressure support. Base 22a is bonded to the opposite side of the diaphragm to form a cavity 56 and provide overpressure support. In this configuration pressure P1 must be applied as a uniform field completely surrounding the sensor and filling cavity 54. Pressure P2 must be brought into cavity 56 through a separate tube or capillary 26. If cavity 54 was vented to atmosphere the device would measure gage pressure, if it was evacuated and sealed the device would measure absolute pressure.

Figure 7:
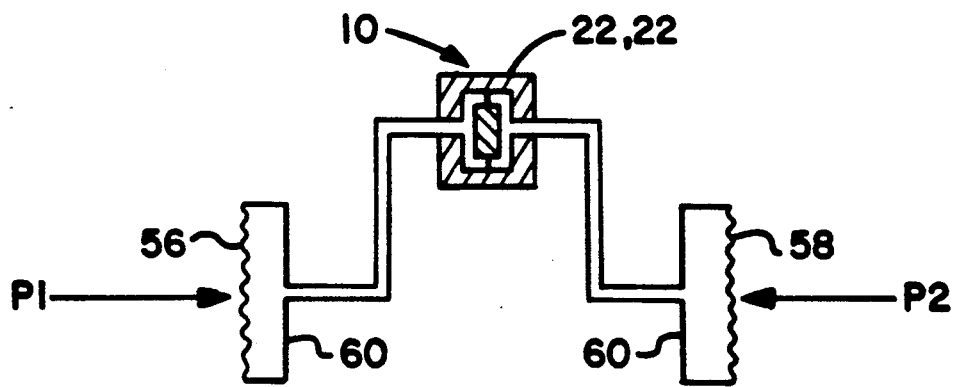
FIG. 7 is a schematic cross-sectional elevational view of a pressure sensor of the invention isolated from a corrosive process material.

The sensor 10 of the invention can be used to measure non-corrosive gases or air without needing any type protection. In many cases, the involved process consists of a corrosive gas or liquid and the device must be isolated from the process. An example of this is shown in FIG. 7. The sensor 10 is mounted in housing 20, 22 which is made of a material that isn't attacked by the process. The sensor is hydraulically coupled to the process through isolation diaphragms 56 and 58 and a virtually incompressible fluid such as silicone oil 60. Standard connections and evacuation and filling techniques can be used to fill the housing and sensor cavities.

I claim:

1. In a pressure sensor of the type which includes a diaphragm sandwiched between housing members, each with conduits to the exterior, the improvement comprising:
   a diaphragm having a rigid center disc with opposing flat sides;
   a rigid peripheral rim having a recess open in the direction toward the disc; and
   a thin flexible web integral with and spanning the entire annulus between said rigid center disc and said rigid peripheral rim such that said rigid disc is suspended by said web to move axially in piston-like fashion upon the application of pressure to one side thereof, said web being integrally attached to the rim within the recess and said recess being an undercut portion of said rim on at least side of said internal web.

2. In a pressure sensor of the type which includes a diaphragm sandwiched between housing members, each with conduits to the exterior, the improvement comprising:
   a diaphragm having a rigid center disc with opposing flat sides;
   a rigid peripheral rim having a recess open in the direction toward the disc; and
   a thin flexible web integral with and spanning the entire annulus between said rigid center disc and said rigid peripheral rim such that said rigid disc is suspended by said web to move axially in piston-like fashion upon the application of pressure to one side thereof, said web being integrally attached to the rim within the recess and said recess being an undercut portion of said rim on both sides of said integral web.

3. The pressure sensor of claim 2 in which the web is tapered in thickness to minimize diaphragm stress.

4. The pressure sensor of claim 3 in which the thickest part of the web is adjacent the rim.

5. The pressure sensor of claim 2 in which the disc is suspended by the web in a central cavity formed by the rim and the housing members' inner surfaces.

6. The pressure sensor of claim 5 in which there are two housing members and the rim is sandwiched therebetween and defines therewith two sealed rim joints.

7. The pressure sensor of claim 6 in which the housing formed by the housing members includes means for engaging at least one of the flat sides of the disc upon application of an overpressure thereto.

8. The pressure sensor of claim 7 in which the means for engaging is a flat surface on one of the housing members.

9. The pressure sensor of claim 7 in which the means for engaging is a flat surface on each of said housing members, each one spaced from and facing a respective opposite flat side of said disc.

10. The pressure sensor of claim 9 in which the disc and the means for engaging have conductive material thereon and form a capacitor.

11. The pressure sensor of claim 2 in which the web includes piezoresistors for creating with conventional circuitry an electrical output which is directly proportional to a pressure change against the disc.

12. The pressure sensor of claim 2 in which a rim recess is on only one side of the web and a first pressure is applied in the form of a uniform field completely surrounding the sensor and filling the housing and rim defined cavity on the side of the disc opposite the rim recess, and a second pressure is provided in the cavity on the same side of the web as the recess by means of a separate conduit.

13. The pressure sensor of claim 12 in which the first pressure is vented to the atmosphere to provide a gage pressure.

14. The pressure sensor of claim 12 in which the first side and uniform field is evacuated to provide absolute pressure of the second side entering from the second pressure source outside and separate from the evacuated field.

15. The pressure sensor of claim 2 in which the housing members are of a material resistant to a corrosive process environment, and the housing conduits are each connected to a corrosive process pressure responsive diaphragm by a closed hydraulic system filled with an incompressible fluid, thereby to isolate the sensor from the corrosive process environment.

16. The pressure sensor of claim 2 in which the disc diameter D to web radial span L ration (D/L) is less than ten.

17. The pressure sensor of claim 2 in which the web radial span L to web thickness t ratio (L/t) is greater than five.

18. The pressure sensor of claim 2 in which the rim thickness T to web thickness t ratio (T/t) is greater than five.

19. The pressure sensor of claim 2 in which the diaphragm is made of silicon.

* * * * *